US010453026B2

(12) United States Patent
Ray et al.

(10) Patent No.: US 10,453,026 B2
(45) Date of Patent: Oct. 22, 2019

(54) SYSTEM AND METHOD FOR FORECASTING HIGH-SELLERS USING MULTIVARIATE BAYESIAN TIME SERIES

(71) Applicant: Wal-Mart Stores, Inc., Bentonville, AR (US)

(72) Inventors: Shubhankar Ray, Union City, CA (US); Abhay Jha, Burlingame, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 519 days.

(21) Appl. No.: 14/641,075

(22) Filed: Mar. 6, 2015

(65) Prior Publication Data

US 2016/0260052 A1 Sep. 8, 2016

(51) Int. Cl.
*G06Q 10/00* (2012.01)
*G06Q 30/00* (2012.01)
*G06Q 10/08* (2012.01)
*G06Q 30/02* (2012.01)

(52) U.S. Cl.
CPC ....... *G06Q 10/087* (2013.01); *G06Q 30/0202* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 7,523,047 | B1* | 4/2009 | Neal | ............... G06Q 30/0206 705/7.35 |
| 2005/0131755 | A1* | 6/2005 | Chen | ...................... G06Q 10/06 705/7.31 |
| 2012/0170847 | A1* | 7/2012 | Tsukidate | .............. G06F 16/583 382/190 |

OTHER PUBLICATIONS

Forecasting Sales by Exponentially Weighted Moving Averages Author(s): Peter R. Winters Source: Management Science, vol. 6, No. 3 (Apr. 1960), pp. 324-342.*
A Bayesian Model for Prelaunch Sales Forecasting of Recorded Music Jonathan Lee, Peter Boatwright and Wagner A. Kamakura Management Science vol. 49, No. 2 (Feb. 2003), pp. 179-196.*
A Bayesian Model for Sales Forecasting at Sun Microsystems Phillip M. Yelland Shinji Kim Renée Stratulate Sun Microsystems Laboratories, Menlo Park, California 94025 Published Online: Feb. 16, 2010 pp. 118-129.*

(Continued)

*Primary Examiner* — Alan S Miller
*Assistant Examiner* — Mustafa Iqbal
(74) *Attorney, Agent, or Firm* — Bryan Cave Leighton Paisner LLP (57) ABSTRACT

A system and method for grouping units for forecasting purposes is presented. A sales forecast for a set of stock keeping units (SKUs) is desired. The SKUs are separated into clusters based on the similarity of the SKUs. Then a set of Bayesian multivariate dynamic linear models is chosen to be used to calculate a sales forecast for each of the clusters of SKUs. The accuracy of each dynamic linear model is determined in a training procedure and a set of weights for each dynamic linear model is calculated. Thereafter, the weights can be used with the dynamic linear models to create a weighted average forecast model. The training procedure can be run periodically to maintain the accuracy of the weights. Each procedure can operate on a sliding (Continued)

window of data. Other embodiments are also disclosed herein.

20 Claims, 5 Drawing Sheets

(56) References Cited

OTHER PUBLICATIONS

A Bayesian Model for Prelaunch Sales Forecasting of Recorded Music Jonathan Lee, Peter Boatwright and Wagner A. Kamakura Management Science vol. 49, No. 2 (Feb. 2003), pp. 179-196 (Year: 2003).*

Smith, J. Q. "A generalization of the Bayesian steady forecasting model." Journal of the Royal Statistical Society: Series B (Methodological) 41.3 (1979): 375-387. (Year: 1979).*

Spedding, T. A., and K. K. Chan. "Forecasting demand and inventory management using Bayesian time series." Integrated Manufacturing Systems 11.5 (2000): 331-339. (Year: 2000).*

Forecasting Sales by Exponentially Weighted Moving Averages Author(s): Peter R. Winters Source: Management Science, vol. 6, No. 3 (Apr. 1960), pp. 324-342 (Year: 1960).*

"Forecasting demand and inventory management using Bayesian time series." Jonathan Lee, Peter Boatwright and Wagner A. Kamakura Management Science vol. 49, No. 2 (Feb. 2003), pp. 179-196 (Year: 2003).*

A Bayesian Model for Sales Forecasting at Sun Microsystems Phillip M. Yelland Shinji Kim Renée Stratulate Sun Microsystems Laboratories, Menlo Park, California 94025 Published Online: Feb. 16, 2010 pp. 118-129 (Year: 2010).*

Durbin, J. & Koopman, S.J., "Time Series Analysis by State Space Methods," 2nd ed. (321 pgs—uploaded in 4 parts) 2012.

* cited by examiner

SYSTEM AND METHOD FOR FORECASTING HIGH-SELLERS USING MULTIVARIATE BAYESIAN TIME SERIES

TECHNICAL FIELD

This disclosure relates generally to forecasting, and relates more particularly to forecasting sales for a retail business.

BACKGROUND

A retail business typically needs to stock items in a warehouse or store in order to sell the items. Storing too few of a particular item can be undesirable because if the item becomes sold out, then the retail business is not able to sell the item until it becomes in stock again. Storing too many of a particular item also can be undesirable because the amount of space in a warehouse or store is finite—storing too many of an item that does not sell takes away space from items that do sell. It would be desirable to have a system that can more accurately forecast the sales of items for a retailer or distributor.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a method can comprise: receiving a set of stock keeping units (SKUs); creating a set of one or more clusters of SKUs from the set of SKUs; choosing a set of Bayesian multivariate dynamic linear models to be used to calculate a sales forecast for each SKU by clusters of SKUs; determining a set of training weight for each dynamic linear model in the set of dynamic linear models by retrospectively regressing historical sales on sales forecasts from each dynamic linear model by time-series cross-validation; using the set of training weights to calculate the sales forecast for all SKUs across all clusters of SKUs; and ordering inventory based on the sales forecasts for all SKUs across all clusters of SKUs.

In one embodiment, a system can comprise: a user input device; a display device; one or more processing modules; and one or more non-transitory storage modules storing computing instructions configured to run on the one or more processing modules and perform the acts of receiving a set of stock keeping units (SKUs); creating a set of one or more clusters of SKUs from the set of SKUs; choosing a set of Bayesian multivariate dynamic linear models to be used to calculate a sales forecast for each SKU by clusters of SKUs; determining a set of training weight for each dynamic linear model in the set of dynamic linear models by retrospectively regressing historical sales on sales forecasts from each dynamic linear model by time-series cross-validation; using the set of training weights to calculate the sales forecast for all SKUs across all clusters of SKUs; and ordering inventory based on the sales forecasts for all SKUs across all clusters of SKUs.

Further embodiments include at least one non-transitory memory storage module having computer instructions stored thereon executable by one or more processing modules to: receive a set of stock keeping units (SKUs); create a set of one or more clusters of SKUs from the set of SKUs; choose a set of Bayesian multivariate dynamic linear models to be used to calculate a sales forecast for each SKU by clusters of SKUs; determine a set of training weight for each dynamic linear model in the set of dynamic linear models by retrospectively regressing historical sales on sales forecasts from each dynamic linear model by time-series cross-validation; use the set of training weights to calculate the sales forecast for all SKUs across all clusters of SKUs; and order inventory based on the sales forecasts for all SKUs across all clusters of SKUs.

Figure 1:
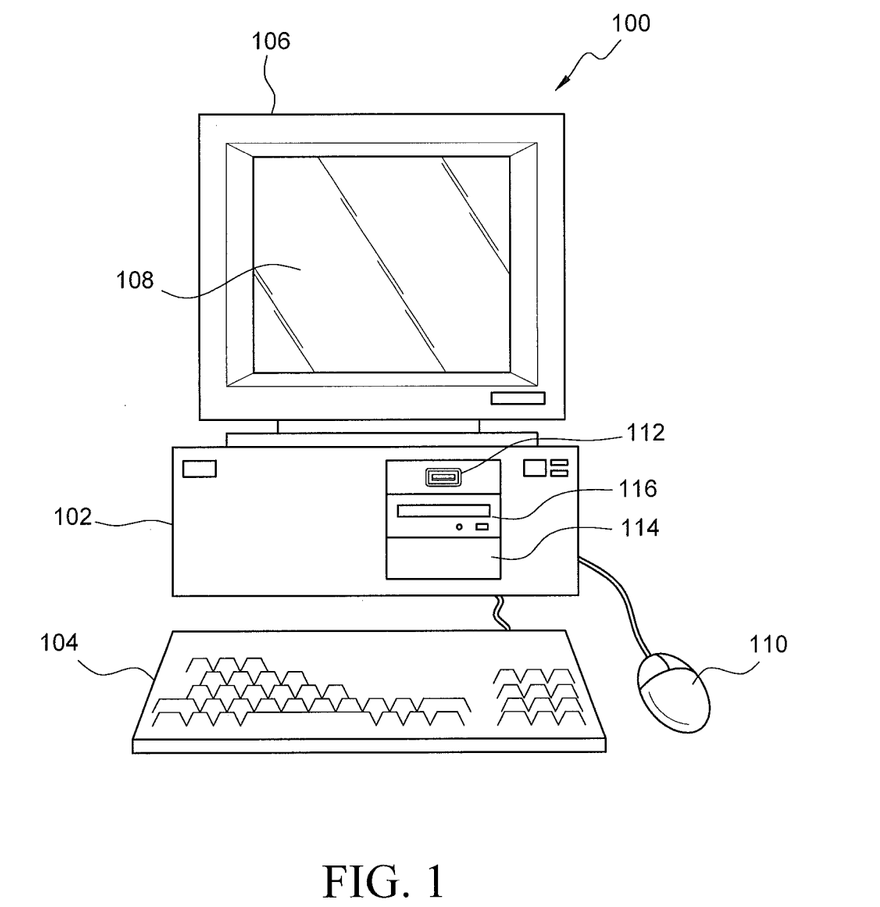
FIG. 1 illustrates a front elevation view of a computer system that is suitable for implementing an embodiment of the system.
Figure 2:
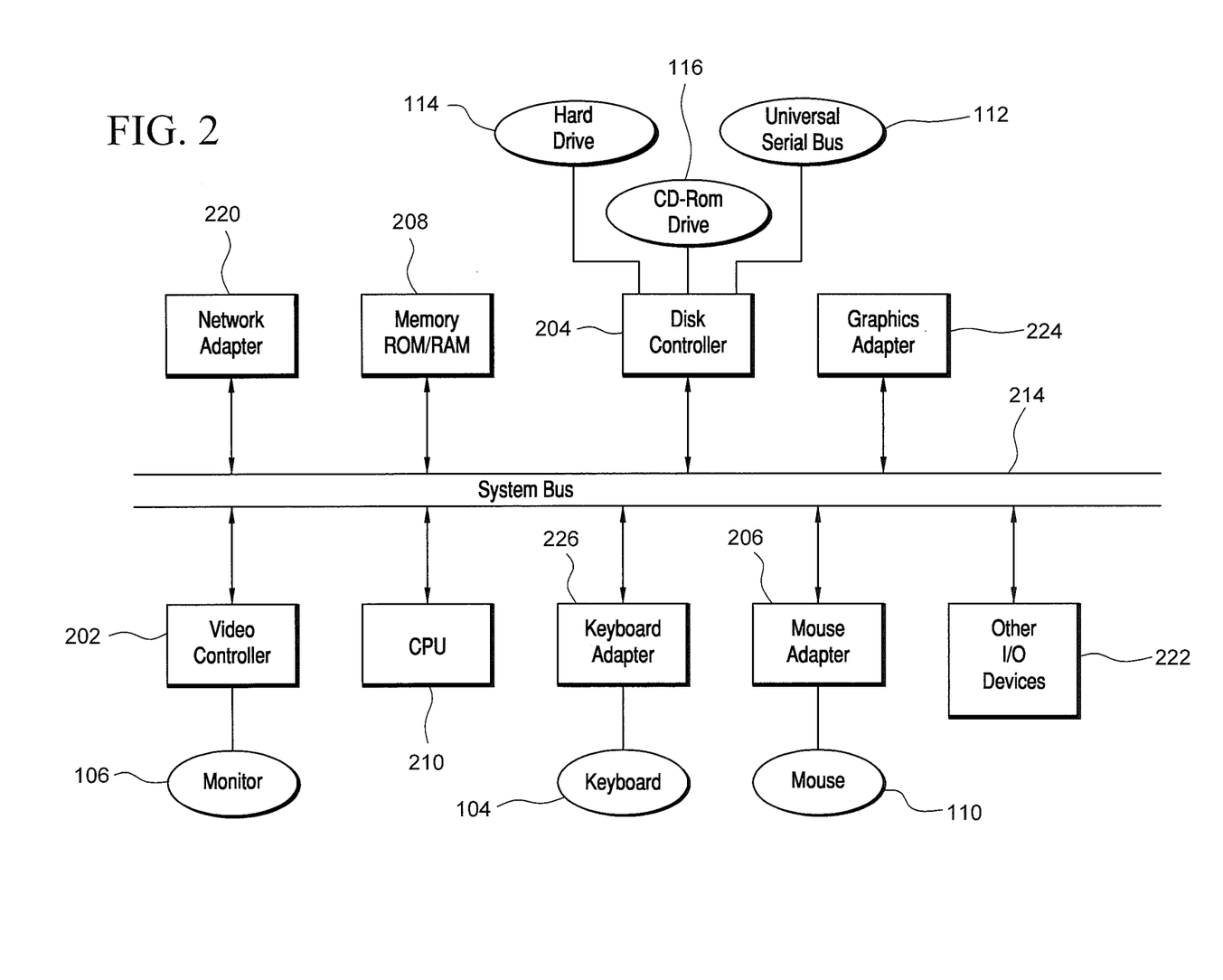
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) can also be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Forecasting is a key problem encountered in inventory planning for retailers and distributors. In order to buy inventory in advance, retailers or distributors would like an estimate of the number of units a distinct item for sale (also known as a stock keeping unit or a "SKU") is going to sell in a certain time period. To clarify the difference an item might be, for example, an iPad. But each specific configuration of the iPad (screen size, memory size, color, radio, and the like) is a different SKU. Each SKU typically has a unique identifier. Buying fewer quantities of a SKU than is needed leads to lost sales opportunities, hence lower revenue, because items that could have been sold were not in stock. Buying too many of a particular SKU units also might lead to increased holding costs and the cost of buying the unused inventory might not be compensated by income from sales to customers and can lead to lost opportunity costs (e.g., items that do not sell occupying space in a warehouse or store in place of items that could have been sold).

Online retail businesses maintain long-tailed inventories where the majority of items have highly volatile and incompletely observed demand with relatively short sales histories. Here demand forecasting (and hence inventory planning or holding adequate stocks in face of uncertain demand) using traditional univariate methods is extremely difficult. While univariate methods are prone to over-parameterization, over-fitting & ultimately inaccurate forecasts in these settings; prudently designed Bayesian multivariate time series (BMTS) models applied to groups of similar items can be used to exploit the cross-sectional correlation between items & avoid these problems. Even so there rarely exists one BMTS model that works all the time & model-averaging, i.e. a weighted average or ensemble of forecasts from multiple BMTS models, can be used to provide more accurate forecasts than any single BMTS model. A novel moving window time series cross-validation scheme is presented where multiple BMTS models are employed to provide retrospective forecasts (by keeping aside observed sales) in different sections of historical data. This provides an objective way of assessing the relative predictive importance of BMTS models—producing weights that can be used for ensemble forecasting. This combination of Bayesian modeling & exhaustive cross-validation can be applied to moderately-sized groups of high-revenue items to produce very accurate forecasts leading to better inventory planning where its most needed.

In general, a retailer or distributor wants to forecast the number of units it will sell so it can accurately purchase the units on a timely basis. Univariate forecasting methods try to extrapolate the information in historical sales of an item. For instance, the average sales level in the recent past (often referred to as the local level) is likely to continue into the near future and the annual seasonality (or seasonal patterns) is likely to determine the long-term structure of future sales. Seasonality can refer both to aggregate seasonality across all items and categories (e.g., sales might be higher during the autumn because of the holiday season), and to product-level seasonality (e.g., some products are generally used only during certain times of the year). For example, swimwear might be more popular in the summer, while Christmas decorations are more popular in the fall and winter.

Figure 4A:
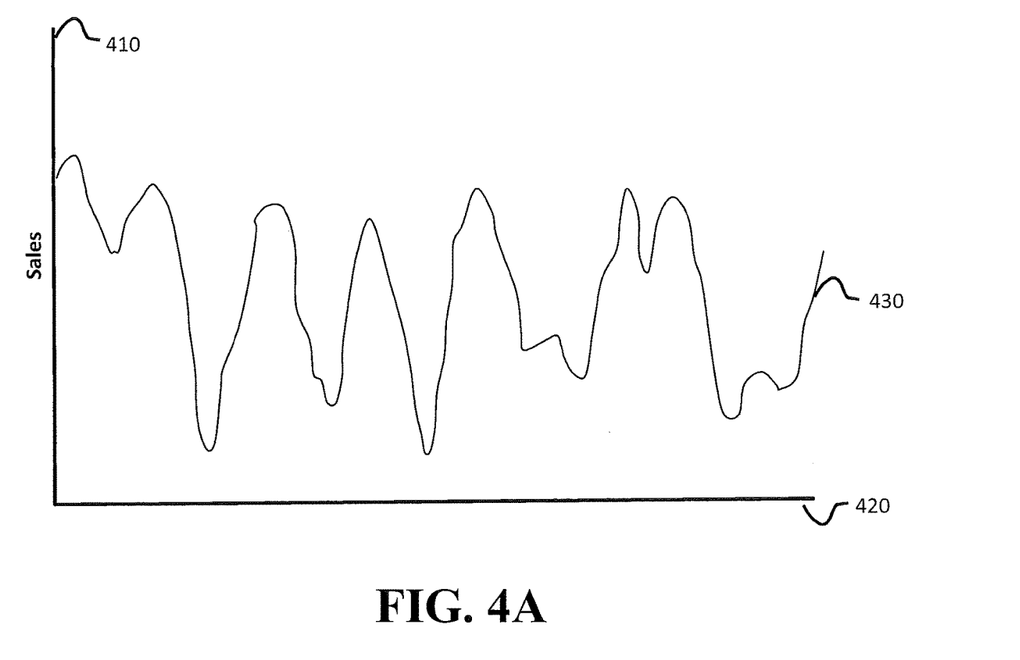
FIGS. 4A-4B illustrate an exemplary sales graph of a stock keeping unit.

With reference to FIG. 4A, a graph illustrating the sales of an exemplary product is illustrated. X-axis 420 is the time period for the sales. For example, FIG. 4A could be an annual graph, and each time period is weekly sales. In another embodiment, FIG. 4A could be a multi-year graph, and each time period could be monthly sales. Other combinations are also possible.

Y-axis 410 is the range of values for sales. Data series 430 represents the sales for each time period represented by X-axis 420. Y-axis 410 can be in a variety of different formats. In some embodiments, Y-axis 410 can represent actual sales. In some embodiments, Y-axis 410 can represent sales rankings. Using rankings as opposed to actual sales can result in more reliable and accurate data in some embodiments. For modeling purposes, two time-series can be considered similar if they rise and fall in unison. A rank correlation metric such as a Pearson correlation or a Spearman correlation can be used to measure similarity between time-series. For display purposes, Y-axis 410 can be linear or logarithmic.

As described above, a retailer would take data such as that illustrated in FIG. 4A and use the data to predict future sales. If the graph is relatively periodic, the retailer can forecast that more of the sales would occur during a certain time of the year and that fewer sales would occur during other times of the year. A few situations can occur that can make the use of such data to predict future sales difficult for some SKUs.

For example, a possible situation can occur with electronic commerce ("eCommerce") retailers. Because eCommerce retailers generally store more SKUs than brick and mortar stores, there might not be enough sales data to model each SKU separately. In addition, eCommerce retailers often stock SKUs that are short-lived or have erratic data. For example, some eCommerce retailers have SKUs that sell out quickly, and there exists a time period where there is no data. In addition, there are SKUs that are short-lived, and thus there might not be available seasonal data from a previous year. Exemplary short-lived SKUs can include clothing (because of fashion trends, some items of clothing are sold only for a single season) and electronics (some forms of electronics, such as cell phone and TVs, are updated regularly, so a particular SKU might not have existed a year ago.)

Figure 4B:
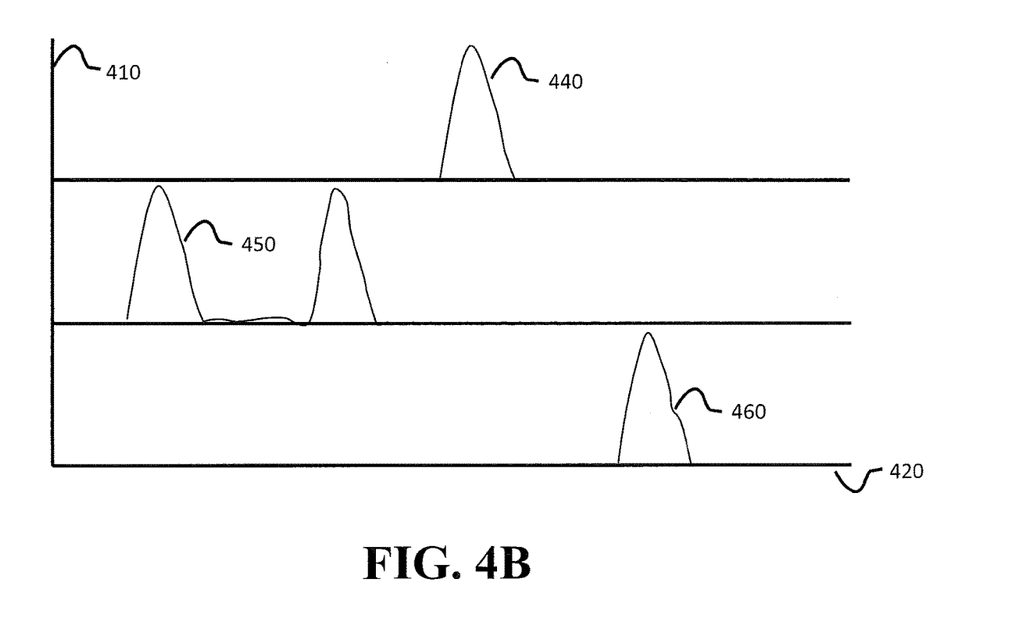

FIG. 4B illustrates three different SKUs that have such situations. The same X-axis 420 and Y-axis 410 that are present in FIG. 4A also are present in FIG. 4B. Data series 440, data series 450, and data series 460 represent the sales of three different items. Data series 440 has incomplete data. Sales are present only for a very short time period, with no sales before or after that time period. This type of data series can be indicative of a short-lived item. Because the item had sales for only a very short-period of time, a popular but short-lived item might be indicative of a product that is no longer made. Data series 450 has two sales spikes, with a period of zero or otherwise low sales in between the sales spikes. Such a data series might be indicative of an item that could not keep up with demand (between the two spikes), and is no longer being made. Or such a data series might be indicative of a seasonal item (explaining the sales spikes) that is no longer being made (explaining the lack of data after the second sales spike). Data series 460 is similar to data series 440 in that it has only a single spike. However, while data series 440 is similar to data series 430 in that a peak for data series 430 roughly coincides with a peak of data series 440, data series 460 has a peak that roughly coincides with a trough of data series 430. This fact can indicate both that the item in data series 460 is a short-lived item and that its sales do not correlate well with the item represented by data series 430. This type of behavior is discussed in further detail below.

One method of solving the above problems is to forecast items in groups (also known as clusters) using multivariate forecasting methods that try to extrapolate the information in historical sales of all items in a group—the same way as univariate methods work at the item-level. Multivariate methods try to exploit the cross-sectional correlation to use the information in sales of neighboring SKUs to drive the sales forecasts or imputations of SKU with unobserved or missing sales. Data series 430, data series 440, and data series 450 could be forecasted using a multivariate time series model when put together in a group. There are several different methods of and systems for grouping SKUs, both already existing and methods/systems developed by the present inventors. In some methods and systems, SKUs are grouped based on similarities in sales and semantics. Other methods can also be used to group SKUs.

Traditional approaches to forecasting include simple & popular ad hoc methods like Holt's or Holt-Winter's smoothing as well as statistical time series models such as the autoregressive integrated moving average (ARIMA) models. Ad hoc methods lack the methodological apparatus required for systematic analysis of complex or atypical time series. For example, while using ad hoc methods it is unclear how to handle incompletely observed time series but statistical models can rely on statistics of missing data. Statistical models are easily extensible, for example, when interaction or correlation between multiple time series is suspected multivariate extensions of ARIMA models (such as vector autoregressive or VAR models) can be used.

The Box & Jenkins methodology provides a systematic procedure for 1. identifying, 2. fitting and 3. diagnosing ARIMA-type models for time series. The literature from this era (1970s) is referred to as classical time series analysis, where one generally starts by decomposing a time series into distinct components like trend, seasonality and randomness. Random or stochastic components imply that the future values of the series can be described by a probability distribution. Forecasting is easier when the stochastic process is stationary (i.e. its probability distribution stays constant in time) because it can be completely described by its mean (level), variance and autocorrelation function. For example, the distribution of a series with trend or seasonality depends on time and is non-stationary. Non-stationary comes in many forms and in classical time series analysis simple transformations are used to convert a non-stationary time series into a stationary one. The residual stationary process is described by autoregressive & moving average (ARMA) models.

Here model identification or selection generally refers to the choice of ARIMA parameters (p,d,q) that best describes the observed time series (d is the order of finite differencing, p and q are the number of AR or MA components). For example, a pure AR process is given by the following equation:

$$\text{ARIMA}(p,0,0) \text{ or } \text{AR}(p): y_t = \Sigma_{i=1}^{P} \alpha_i y_{t-i} + \in_t$$

For a given model, fitting involves the estimation of the coefficients (like $\alpha_i$) $\beta_i$ using maximum likelihood estimation. Model diagnostics involves looking at several summary plots or statistics to assess the fitting quality or forecasting performance. If the estimation is inadequate, we return to step one and attempt to build a better model. Many model selection procedures are available for ARIMA and even for Holt's or Holt-Winter's smoothing. In practice, however, variability makes the model selection a difficult problem, i.e. one might end up selecting very different models by observing the same time series in different time segments. Thus it may not be possible to identify a single best time series model and in recent years many forecasters have increasingly relied on model-averaging (i.e. intelligently combine the forecasts of multiple models) to avoid the problem of model selection and make better forecasts.

The conditions under which ARIMA-type models work well (such as the requirement of large sample sizes) can be unrealistic in many practical applications. Also it is often difficult to interpret fitted ARIMA models in terms of observable structural components of the time series. In other words, when it comes to forecasting ARIMA models do not provide enough leverage to model all aspects of the time series. This is partly a reason why historically many forecasters have resorted to ad hoc methods.

An alternative can found in the class of Bayesian time series models known as dynamic linear models, which were first proposed by Harrison and Stevens (1976) a few years after the work of Box and Jenkins. These models did not gain popularity until the 1990s because, 1. they are not easily amenable to asymptotic analysis used to study the properties of a model in large sample situations and 2., the computational tools required for fitting were largely unavailable. Bayesian models, however, allow the forecasters to incorporate prior knowledge and this can come in very handy when dealing with small number of samples or incomplete data. In forecasting or prediction, careful prior can also be used to penalize models to prevent them for over-fitting.

Dynamic linear models are time-varying regressions where covariates are functions of time. Exemplary dynamic linear models can include local level/trend/polynomial DLMs, seasonal DLMs and time-varying autoregressive DLMs and the like. In addition, it is straightforward to derive multivariate extensions of DLMs the same way as VAR or VARMA models are derived from ARIMA-type models in classical time series analysis. In many ways however multivariate DLMs comprise a much broader and flexible family of modeling techniques than VAR-type models. For example, for a multivariate time series from n items the simplest VAR model, VAR(1) (vector autoregressive with lag 1) has $n^2$ parameters and can easily lead to over-fitting in datasets like ours. While there are Bayesian VAR models that allow penalization to control the effective number of parameters, these multivariate extensions may lack the flexibility of multivariate DLMs. For example, the VAR framework is not amenable seasonal modeling to multivariate DLMs. The flexibility of multivariate DLMs also allow modelers to borrow and incorporate ideas from longitudinal or panel data analysis to exploit cross-sectional correlation and drive forecasting or imputation of sales when some time series segments are missing. Panel analysis allows better estimation of common or correlated parameters of a time-series. The cross-section provides faux-replicates and compensates for shorter time-series.

In multivariate DLMs, the vector $Y_t$ of log-sales for a panel of n items at time t is assumed to be the realizations of a latent process observed in noise, The latent process is linear and has the form $F_t x_t$, where $F_t$ is a given design matrix and $x_t$ is a latent state vector that evolves as a random walk, $Y_t = F_t x_t + \in_t$, where $\in_t \sim N(0, \sigma^2 I_n)$ (Observational)

$x_t = x_{t-1} + \varepsilon_t$, where $\varepsilon_t \sim N(0, \sigma^2 W)$(Evolution)

In Bayesian terminology, this random walk evolution represents a sequential prior for $x_t$ conditional on $x_{t-1}$ and imposes a certain type of smoothness on the linear latent process. In particular, the diagonal elements of W determine the amount of temporal smoothing and the off-diagonals determine the cross-sectional or between-item smoothing. It is this smoothing (in time or between-items) which ultimately dictates the effective number of parameters in the model and while dealing with incomplete data we want to increase the amount of smoothing and reduce the effective number of parameters to prevent the model for over-fitting.

Fitting or forecasting with DLMs proceeds via the Bayesian update, i.e. if the observational equation and the prior can be used to derive the posterior, which incorporates both evidence (information prior data) as well as the constraint or assumption (information present in prior). In particular, when $p(Y_t|x_t)$ and $p(x_t|x_{t-1})$ are Gaussian, the posterior distribution $p(x_t|Y_t)$ is also Gaussian, in which case it suffices to repetitively or sequentially update the first two moments—the mean and variance of the latent process $x_t$ in time. These sequential steps are formalized in the Kalman filter, which estimates of the true values of states of a dynamic linear model (or more generally any state space model) recursively over time using incoming measurements. Because of the models formulation and the recursive nature of the algorithm, it can be run in real time using only the present input measurements, the previously calculated state, and its uncertainty matrix; no additional past information is required.

Our multivariate DLMs are specified as $$Y_t = \mu_t + \psi(t)\alpha_t + \epsilon_t$$

where $\epsilon_t \sim N(0, \sigma^2 I_n)$ (Observational)

$$\begin{bmatrix} \mu_t \\ \alpha_t \end{bmatrix} = \begin{bmatrix} \mu_{t-1} \\ \alpha_{t-1} \end{bmatrix} + \begin{bmatrix} \varepsilon_{1,t} \\ \varepsilon_{2,t} \end{bmatrix}$$

where $$\begin{bmatrix} \varepsilon_{1,t} \\ \varepsilon_{2,t} \end{bmatrix} \sim N\left(\begin{bmatrix} 0 \\ 0 \end{bmatrix}, \begin{bmatrix} g_1 \sigma^2 R_1 & 0 \\ 0 & g_2 \sigma^2 R_2 \end{bmatrix}\right)$$

where, $\mu_t$ is a n×1 vector of local levels and $\alpha_t$ is a n×1 vector of local seasonal coefficients (relative to a common annual seasonal profile $\psi(t)$ for the panel of items) for the n items. Here the latent local level and seasonal coefficients evolve in time as random walks and comprise the state vector $x_t$ defined earlier. The disturbance vectors $\varepsilon_{1,t}$ and $\varepsilon_{2,t}$ are multivariate normal random variables with variances $g_1 \sigma^2$ and $g_2 \sigma^2$; and correlations $R_1$ and $R_2$. The parameters $(g_1, g_2)$ are referred to as variance loadings and determine the relative magnitudes of the local level and seasonal coefficient process. For example, for a group of items with little or no annual seasonal pattern, the parameter $g_2$ may be forced to be 0, which also means that a priori the local seasonal process is constant or completely smooth. In other words, small values of the variance loadings can also be associated with increasing smoothness of the local level or seasonal process. The correlation matrices are assumed to be compound symmetric or exchangeable, i.e.

$$R_i = \begin{pmatrix} 1 & \rho_i & \cdots & \rho_i \\ \rho_i & 1 & \cdots & \rho_i \\ \vdots & \vdots & \ddots & \vdots \\ \rho_i & \rho_i & \cdots & 1 \end{pmatrix}$$

implying that the disturbances (and hence the local levels and local seasonal coefficients themselves in the long term) are a priori equally correlated. This compound symmetric specification imposes another form of smoothness that works not over time but across items, for example, in the extreme case when $\rho_1=1$ the local level processes for all items are the same a priori.

In our datasets, it helps to keep the between item correlations for the local level and seasonality (i.e. $\rho_1$ and $\rho_2$) close to 1. In fact, in almost all retail product categories we keep their values fixed to 0.8. In contrast, the selection of the variance loadings $(g_1, g_2)$ is a much harder problem, because 1., their may not be a unique optimal value for any cluster of items and 2., their range of values may change drastically between categories and even between clusters of items within the same category. In other words, there is a lot of uncertainty surrounding model specification which is similar to the problem of finding the right parameters (p,d,q) for ARIMA-type models. In recent years, modelers and forecasters alike have resorted to model averaging to overcome this problem where forecasts from several candidate models are averaged with weights in an effort to reduce the variability or uncertainty of modeling.

In the fully Bayesian formulation of model averaging, one can assign priors to $(g_1, g_2)$ and calculate the predictions from the following marginal predictive distribution (i.e. distribution of future values of $Y_t$ given its history independent of the variance loadings), $$f(Y_t|Y_{1:t-1}) = \int f(Y_t|Y_{1:t-1},g_1,g_2) f(g_1,g_2|Y_{1:t-1}) d(g_1,g_2)$$

where $f(Y_t|Y_{1:t-1}, g_1g_2)$ denotes the conditional predictive distribution made available by the Kalman filter for a multivariate DLM for a given value of the pair $(g_1, g_2)$. Bayesian model averaging however can be computationally very demanding and we rely on a simpler frequentist method based on time series cross-validation to calculate the weights or equivalents of $f(g_1, g_2|Y_{1:t-1})$.

We create a candidate set of M multivariate DLMs with different values of $(g_1, g_2)$. We set aside sales from a historical time segment or window and try to forecast the sales for items in a cluster using all the M models using sales preceding the window. This is clone multiple times by moving or sliding the time segment or window in historical time; and for all clusters of items in a given retail product category. This moving window cross-validation leads to a set of M forecasts $(y_{it}^{(1)}, y_{it}^{(2)}, \ldots, y_{it}^{(M)})$ and the true sales (say $y^*_{it}$) for every item across multiple product clusters. within a product category for multiple windows located at historical times t.

Following this step, the problem of finding the weights associated with each model can be cast as a regression problem, $$y^*_{it} = \omega_1 y_{it}^{(1)} + \omega_2 y_{it}^{(2)} + \ldots + \omega_M y_{it}^{(M)} \text{ such that } \omega_i \geq 0$$
$$\text{and } \Sigma_i \omega_i = 1$$

This regression can be approached in many ways one of them being non-negative least squares (NNLS). NNLS is a version of the least squares problem where the coefficients are not allowed to become negative. That is, given a matrix A and a column vector of response variables y, the goal is to find the following:

$$\arg_x \min \|y - Ax\|_2 \text{ subject to } x \geq 0.$$

Since the weights estimated by solving this NNLS regression may not necessarily add up to 1. We normalize the weights by dividing each of the estimated weights by the sum of all estimated weights.

In summary, a complex process can be divided into many R functions. Training is then performed via offline moving window time series cross-validation. Various exhaustive, high-precision, but time-consuming calculations can be applied to a small group of items. The end result is a more accurate forecast than was previously possible.

Figure 3:
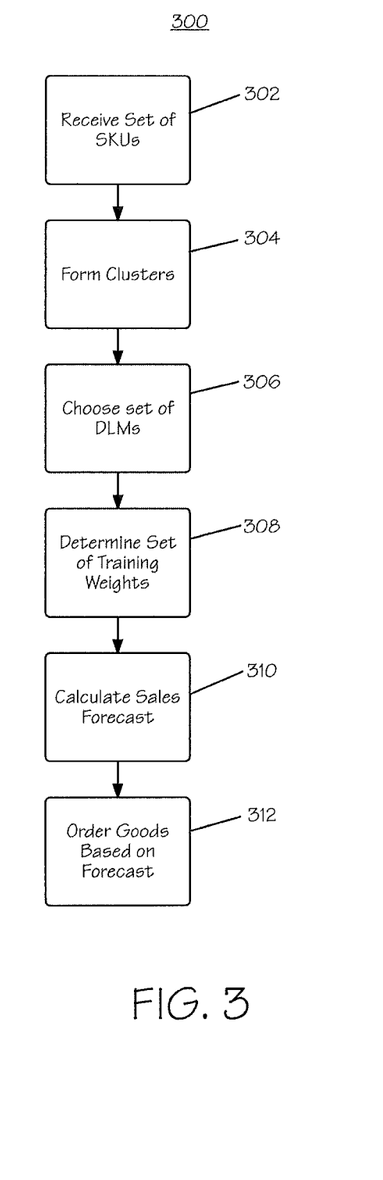
FIG. 3 is a flowchart illustrating the operation of a method of predicting sales behavior.

With reference to FIG. 3, a flowchart illustrating the operation of a method 300 of training and using DLMs is presented. Method 300 is merely exemplary and is not limited to the embodiments presented herein. Method 300 can be employed in many different embodiments or examples not specifically depicted or described herein. In some embodiments, the procedures, the processes and/or the activities of method 300 can be performed in the order presented. In other embodiments, the procedures, the processes, and/or the activities of method 300 can be performed in any other suitable order. In still other embodiments, one or more of the procedures, the processes, and/or the activities of method 300 can be combined or skipped. In some embodiments, method 300 can be implemented by computer system 100 (FIG. 1).

A set of SKUs are received by an embodiment to generate a forecast (block 302). Clusters can be formed that group similar SKUs into clusters for forecasting purposes (block 304). The grouping for forecasting purposes can be accomplished in a variety of different manners. Exemplary grouping methods are presented in the following U.S. patent applications, the contents of which are incorporated herein by this reference: Ser. No. 14/638,637, filed Mar. 4, 2015, and Ser. No. 14/638,694, filed Mar. 4, 2015. Other clustering algorithms also can be used. Thereafter, an embodiment chooses a set of Bayesian multivariate Dynamic Linear Models (DLMs) to be used for the clusters (block 306). Examples of the types of DLMs that can be performed are detailed above. Other DLMs also can be used.

Then, a weighted average of individual DLM forecasts is calculated to determine a fitting of the DLM forecasts (block 308). This process can be called "training." This process can involve evaluating each of the DLMs used in a periodic manner. In some embodiments, such a training can be performed every three months. During such a training, all DLMs are fitted in a number of sliding windows to evaluate their forecast accuracies over the sales during a predetermined time period. In some embodiments, the predetermined time period can be one year. In such an embodiment, the number of sliding windows can be related to the data. For example, the data might be weekly, in which case 26 sliding windows, each a week apart, can be used. In other words, a first sliding window of time can be weeks 1 through 26 of a particular calendar year. A second sliding window can be weeks 2 through 27 of the same calendar year. A third sliding window can be weeks 3 through 28 of the same calendar year. And so on, until the $26^{th}$ sliding window covers weeks 26 through 52 of the same calendar year or another particular time period.

The time period can be calculated working backwards from the time of the training. In other words, week 1 is the time period covering a week prior to training, week 2 is the time period covering a time period starting 2 weeks prior to training, and so forth. Such a process of creating multiple time windows that overlap can help to ensure the accuracy of an embodiment while also ensuring that each portion of time is taken into account for seasonality purposes.

In some embodiments, the predetermined time period can be half a year, with fewer sliding time windows being used. In some embodiments, other shorter or longer predetermined time periods can be used with other numbers of sliding time windows.

In some embodiments, the fitting is performed using a Kalman filter. Then a NNLS regression is performed to calculate a weight for each DLM. The algorithm used is that a fitting of each DLM is performed using a Kalman filter. The Kalman filter can work for Gaussian distribution and sweeps through the sales by updating the mean and covariance over time. The downside is that the training can be complex—in an embodiment where 26 sliding windows are used, there will be 26 calls of the Kalman filter. This process would then be repeated for each of the different DLMs. In some embodiments, there can be up to 40 different DLMs used, meaning that up to 1,040 calls of the Kalman filter function is performed in such an embodiment. That large number of calls can be computationally intense. Because of the computational intensity, in some embodiments, only a portion of the SKUs sold by a particular retailer/distributor might be included in the calculations. In some embodiments, only the highest-selling SKUs may be included in the calculations. For example, the SKUs that comprise the top 10% of sellers of a retailer/distributor might be included in an embodiment. The increased accuracy of forecasts using an embodiment described herein might not make up for the possibly time-consuming calculations described herein.

After the weights of each DLM is determined in a training procedure, the weights are then used to calculate the forecast for the cluster of SKUs (block 310). In other words, after the training procedure described above, the accuracy of each DLM was determined and the more accurate DLMs were assigned a greater weight. The training procedure can be repeated in a periodic manner to recalculate weights for the DLMs. In some embodiments, the training procedure can be performed once every three months.

Thereafter, the DLMs are calculated for each cluster of SKUs. The calculated weights are assigned to each DLM. Then an aggregate calculation is performed based on the weights of each DLM. This aggregate calculation is the basis for the overall forecast of the SKU. Products can then be ordered based on the forecast (block 312).

Figure 5:
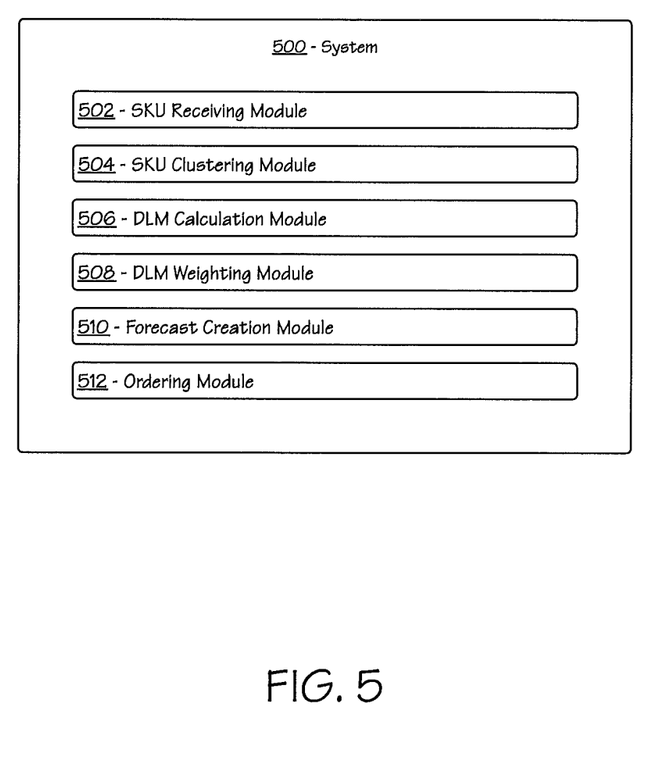
FIG. 5 is a block diagram illustrating a system capable of performing a method of predicting sales behavior.

Turning ahead in the figures, FIG. 5 illustrates a block diagram of a system 500 that is capable of performing disclosed embodiments. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

In a number of embodiments, system 500 can include SKU receiving module 502. In certain embodiments, SKU receiving module 502 can perform block 302 (FIG. 3) of receiving a set of SKUs.

In a number of embodiments, system 500 can include SKU clustering module 504. In certain embodiments, SKU clustering module 504 can perform block 304 (FIG. 3) of creating clusters of SKUs.

System 500 can include DLM calculation module 506. In certain embodiments, DLM calculation module 506 can perform block 306 (FIG. 3) of calculating DLMs for each cluster.

System 500 can include DLM weighting module 508. In certain embodiments, DLM weighting module 508 can perform block 308 (FIG. 3) of calculating a weighting for each DLM.

System 500 can include forecast creation module 510. In certain embodiments, forecast creation module 510 can perform block 310 (FIG. 3) of creating a forecast for a cluster of SKUs based on the weights of each DLM.

System 500 can include ordering module 512. In certain embodiments, ordering module 512 can perform block 312 (FIG. 3) of ordering products based on the created forecast.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 can be modified, and that the foregoing discussion of certain of these embodiments does not necessarily represent a complete description of all possible embodiments. For example, one or more of the procedures, processes, or activities of FIGS. 1-5 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:

receiving, from one or more non-transitory storage modules, a set of stock keeping units (SKUs);

creating, at one or more processing modules, a set of one or more clusters of SKUs from the set of SKUs;

storing, at the one or more non-transitory storage modules, the set of one or more clusters of SKUs;

choosing, at the one or more processing modules, a set of Bayesian multivariate dynamic linear models (DLMs) to be used to calculate a sales forecast for each SKU of at least a portion of the set of SKUs using the set of one or more clusters of SKUs, wherein the set of one or more clusters of SKUs comprises the at least the portion of the set of SKUs;

determining, at the one or more processing modules, a set of training weights of a conditional predictive distribution for each Bayesian multivariate DLM in the set of Bayesian multivariate DLMs with different values of variance loading parameters that determine relative magnitudes of local levels and seasonal coefficients in the Bayesian multivariate DLMs by:

obtaining, from the one or more non-transitory storage modules, first historical sales from a first historical time segment for the set of one or more clusters of SKUs;

forecasting, at the one or more processing modules, first forecasted sales for the first historical time segment for the set of one or more clusters of SKUs:

(1) using, in the set of Bayesian multivariate DLMs, first preceding sales of the set of one or more clusters of SKUs that preceded the first historical sales of the set of one or more clusters of SKUs; and (2) without using, in the set of Bayesian multivariate DLMs, the first historical sales from the first historical time segment;

storing, at the one or more non-transitory storage modules, the first forecasted sales;

obtaining, from the one or more non-transitory storage modules, second historical sales from a second historical time segment for the set of one or more clusters of SKUs;

forecasting, using the one or more processing modules, second forecasted sales for the second historical time segment for the set of one or more clusters of SKUs:

(1) using, in the set of Bayesian multivariate DLMs, second preceding sales of the set of one or more clusters of SKUs that preceded the second historical sales of the set of one or more clusters of SKUs; and (2) without using, in the set of Bayesian multivariate DLMs, the second historical sales from the second historical time segment;

storing, at the one or more non-transitory storage modules, the second forecasted sales; and retrospectively regressing, at the one or more processing modules, the first historical sales and the second historical sales with the first forecasted sales and the second forecasted sales from each Bayesian multivariate DLM of the set of Bayesian multivariate DLMs by a time-series cross-validation;

storing, at the one or more non-transitory storage modules, the set of training weights;

using the set of training weights to calculate, at the one or more processing modules, the sales forecast for each SKU of at least the portion of the set of SKUs;

purchasing inventory for each SKU of the at least the portion of the set of SKUs based on the sales forecast for each SKU of the at least the portion of the set of SKUs;

receiving the inventory for each SKU of the at least the portion of the set of SKUs at a warehouse or a brick and mortar store;

recording sales data for the inventory for each SKU of the at least the portion of the set of SKUs; and repeating a step of determining, at the one or more processing modules, the set of training weights of the conditional predictive distribution for each Bayesian multivariate DLM in the set of Bayesian multivariate DLMs with the different values of the variance loading parameters that determine the relative magnitudes of the local levels and the seasonal coefficients in the Bayesian multivariate DLMs using the sales data for the inventory for each SKU of the portion of the set of SKUs as the first historical sales or the second historical sales, wherein:

the set of Bayesian multivariate DLMs are specified as:

$$Y_t = \mu_t + \psi(t)\alpha_t + \epsilon_t \text{ where } \epsilon_t \sim N(0, \sigma^2 I_n) \text{(observational)}$$

$$\begin{bmatrix} \mu_t \\ \alpha_t \end{bmatrix} = \begin{bmatrix} \mu_{t-1} \\ \alpha_{t-1} \end{bmatrix} + \begin{bmatrix} \varepsilon_{1,t} \\ \varepsilon_{2,t} \end{bmatrix} \text{ where}$$

$$\begin{bmatrix} \varepsilon_{1,t} \\ \varepsilon_{2,t} \end{bmatrix} \sim N\left(\begin{bmatrix} 0 \\ 0 \end{bmatrix}, \begin{bmatrix} g_1\sigma^2 R_1 & 0 \\ 0 & g_2\sigma^2 R_2 \end{bmatrix}\right)$$

$Y_t$ comprises a vector of log-sales for a panel of n items at a time t;

$\mu_t$ comprises a nx1 vector of the local levels;

$\alpha_t$ comprises a nx1 vector of the seasonal coefficients relative to a common annual seasonal profile $\psi(t)$ for the panel of n items;

$\varepsilon_{1,t}$ and $\varepsilon_{2,t}$ comprise disturbance vectors comprising multivariate normal random variables with variances $g_1\sigma^2$ and $g_2\sigma^2$;

correlations $R_1$ and $R_2$, ($g_1$, $g_2$) comprise variance loadings parameters that determine relative magnitudes of the local levels and the seasonal coefficients; and determining the set of training weights comprises performing the time-series cross-validation of the set of Bayesian multivariate DLMs to fit a linear regression.

2. The method of claim 1, wherein:
determining the set of training weights comprises using a non-linear least squares method to fit the linear regression.

3. The method of claim 1, wherein:
choosing the set of Bayesian multivariate DLMs to be used to calculate the sales forecast for each SKU of the at least the portion of the set of SKUs comprises choosing parameters for each Bayesian multivariate DLM in the set of Bayesian multivariate DLMs, the parameters being related to a seasonality of each SKU of the set of one or more clusters of SKUs.

4. The method of claim 1 further comprising:
periodically determining an accuracy of each Bayesian multivariate DLM in the set of Bayesian multivariate DLMs; and periodically re-creating the set of training weights for each Bayesian multivariate DLM in the set of Bayesian multivariate DLMs to recalculate the set of training weights for each Bayesian multivariate DLM in the set of Bayesian multivariate DLMs.

5. The method of claim 4, wherein:
periodically determining the accuracy of each Bayesian multivariate DLM in the set of Bayesian multivariate DLMs comprises comparing sales forecasts for a plurality of overlapping time periods.

6. The method of claim 5, wherein:
each of the plurality of overlapping time periods is 26-weeks long; and
each of the plurality of overlapping time periods starts one week after a previous time period.

7. The method of claim 1, wherein:
determining the set of training weights comprises using a non-linear least squares method to fit the linear regression;

choosing the set of Bayesian multivariate DLMs to be used to calculate the sales forecast for each SKU of at least the portion of the set of SKUs comprises choosing parameters for each Bayesian multivariate DLM in the set of Bayesian multivariate DLMs, the parameters being related to a seasonality of each SKU of the set of one or more clusters of SKUs; and the method further comprises:
periodically determining an accuracy of each Bayesian multivariate DLM in the set of Bayesian multivariate DLMs by comparing sales forecasts for a plurality of overlapping time periods; and periodically re-creating the set of training weights for each Bayesian multivariate DLM in the set of Bayesian multivariate DLMs to recalculate the set of training weights for each Bayesian multivariate DLM in the set of Bayesian multivariate DLMs, wherein each of the plurality of overlapping time periods is 26-weeks long, and each of the plurality of overlapping time periods starts one week after a previous time period.

8. A system comprising:
one or more processing modules; and
one or more non-transitory storage modules storing computing instructions configured to run on the one or more processing modules and perform acts of:
receiving, from the one or more non-transitory storage modules, a set of stock keeping units (SKUs);
creating, at the one or more processing modules, a set of one or more clusters of SKUs from the set of SKUs;
storing, at the one or more non-transitory storage modules, the set of one or more clusters of SKUs;

choosing, at the one or more processing modules, a set of Bayesian multivariate dynamic linear models (DLMs) to be used to calculate a sales forecast for each SKU of at least a portion of the set of SKUs using the set of one or more clusters of SKUs, wherein the set of one or more clusters of SKUs comprises the at least the portion of the set of SKUs;

determining, at the one or more processing modules, a set of training weights of a conditional predictive distribution for each Bayesian multivariate DLM in the set of Bayesian multivariate DLMs by:
  obtaining, from the one or more non-transitory storage modules, first historical sales from a first historical time segment for the set of one or more clusters of SKUs;
  forecasting, at the one or more processing modules, first forecasted sales for the first historical time segment for the set of one or more clusters of SKUs:
    (1) using, in the set of Bayesian multivariate DLMs, first preceding sales of the set of one or more clusters of SKUs that preceded the first historical sales of the set of one or more clusters of SKUs; and
    (2) without using, in the set of Bayesian multivariate DLMs, the first historical sales from the first historical time segment;
  storing, at the one or more non-transitory storage modules, the first forecasted sales;
  obtaining, from the one or more non-transitory storage modules, second historical sales from a second historical time segment for the set of one or more clusters of SKUs;
  forecasting, using the one or more processing modules, second forecasted sales for the second historical time segment for the set of one or more clusters of SKUs:
    (1) using, in the set of Bayesian multivariate DLMs, second preceding sales of the set of one or more clusters of SKUs that preceded the second historical sales of the set of one or more clusters of SKUs; and
    (2) without using, in the set of Bayesian multivariate DLMs, the second historical sales from the second historical time segment;
  storing, at the one or more non-transitory storage modules, the second forecasted sales; and
  retrospectively regressing, at the one or more processing modules, the first historical sales and the second historical sales with the first forecasted sales and the second forecasted sales from each Bayesian multivariate DLM of the set of Bayesian multivariate DLMs by a time-series cross-validation;

storing, at the one or more non-transitory storage modules, the set of training weights;
using the set of training weights to calculate, at the one or more processing modules, the sales forecast for each SKU of the at least the portion of the set of SKUs;
purchasing inventory for each SKU of the at least the portion of the set of SKUs based on the sales forecast for-each SKU of at least the portion of the set of SKUs;
receiving the inventory for each SKU of the at least the portion of the set of SKUs at a warehouse or a brick and mortar store;

recording sales data for the inventory for each SKU of the at least the portion of the set of SKUs; and
repeating a step of determining, at the one or more processing modules, the set of training weights of the conditional predictive distribution for each Bayesian multivariate DLM in the set of Bayesian multivariate DLMs with different values of variance loading parameters that determine relative magnitudes of local levels and seasonal coefficients in the set of Bayesian multivariate DLMs using the sales data for the inventory for each SKU of the portion of the set of SKUs as the first historical sales or the second historical sales, wherein:
  the set of Bayesian multivariate DLMs are specified as:

$$Y_t = \mu_t + \psi(t)\alpha_t + \epsilon_t \text{ where } \epsilon_t \sim N(0, \sigma^2 I_n)\text{(observational)}$$

$$\begin{bmatrix} \mu_t \\ \alpha_t \end{bmatrix} = \begin{bmatrix} \mu_{t-1} \\ \alpha_{t-1} \end{bmatrix} + \begin{bmatrix} \varepsilon_{1,t} \\ \varepsilon_{2,t} \end{bmatrix} \text{ where}$$

$$\begin{bmatrix} \varepsilon_{1,t} \\ \varepsilon_{2,t} \end{bmatrix} \sim N\left(\begin{bmatrix} 0 \\ 0 \end{bmatrix}, \begin{bmatrix} g_1\sigma^2 R_1 & 0 \\ 0 & g_2\sigma^2 R_2 \end{bmatrix}\right);$$

$Y_t$ comprises a vector of log-sales for a panel of n items at a time t;
  $\mu_t$ comprises a nx1 vector of the local levels;
  $\alpha_t$ comprises a nx1 vector of the seasonal coefficients relative to a common annual seasonal profile $\psi(t)$ for the panel of n items;
  $\varepsilon_{1,t}$ and $\varepsilon_{2,t}$ comprise disturbance vectors comprising multivariate normal random variables with variances $g_1\sigma^2$ and $g_2\sigma^2$;
  correlations $R_1$ and $R_2$, $(g_1, g_2)$ comprise variance loadings parameters that determine relative magnitudes of the local levels and the seasonal coefficients; and
  determining the set of training weights comprises performing the time-series cross-validation of the set of Bayesian multivariate DLMs to fit a linear regression.

9. The system of claim 8, wherein:
determining the set of training weights comprises using a non-linear least squares method to fit the linear regression.

10. The system of claim 8, wherein:
choosing the set of Bayesian multivariate DLMs to be used to calculate the sales forecast for each SKU of the at least the portion of the set of SKUs comprises choosing parameters for each Bayesian multivariate DLM in the set of Bayesian multivariate DLMs, the parameters being related to a seasonality of each SKU of the set of one or more clusters of SKUs.

11. The system of claim 8, wherein the one or more non-transitory storage modules storing the computing instructions are further configured to run on the one or more processing modules and perform acts of:
periodically determining an accuracy of each Bayesian multivariate DLM in the set of Bayesian multivariate DLMs; and
periodically re-creating the set of training weights for each Bayesian multivariate DLM in the set of Bayesian multivariate DLMs to recalculate the set of training weights for each Bayesian multivariate DLM in the set of Bayesian multivariate DLMs.

12. The system of claim 11, wherein:
periodically determining the accuracy of each Bayesian multivariate DLM in the set of Bayesian multivariate DLMs comprises comparing sales forecasts for a plurality of overlapping time periods.

13. The system of claim 12, wherein:
each of the plurality of overlapping time periods is 26-weeks long; and
each of the plurality of overlapping time periods starts one week after a previous time period.

14. The system of claim 8, wherein:
determining the set of training weights comprises using a non-linear least squares method to fit the linear regression;
choosing the set of Bayesian multivariate DLMs to be used to calculate the sales forecast for each SKU of the at least the portion of the set of SKUs comprises choosing parameters for each Bayesian multivariate DLM in the set of Bayesian multivariate DLMs, the parameters being related to a seasonality of each SKU of the set of one or more clusters of SKUs; and
the one or more non-transitory storage modules storing the computing instructions are further configured to run on the one or more processing modules and perform acts of:
periodically determining an accuracy of each Bayesian multivariate DLM in the set of Bayesian multivariate DLMs by comparing sales forecasts for a plurality of overlapping time periods; and
periodically re-creating the set of training weights for each Bayesian multivariate DLM in the set of Bayesian multivariate DLMs to recalculate the set of training weights for each Bayesian multivariate DLM in the set of Bayesian multivariate DLMs, wherein each of the plurality of overlapping time periods is 26-weeks long, and each of the plurality of overlapping time periods starts one week after a previous time period.

15. At least one non-transitory memory storage module having computer instructions stored thereon executable by one or more processing modules to:
receive, from one or more non-transitory storage modules, a set of stock keeping units (SKUs);
create, at the one or more processing modules, a set of one or more clusters of SKUs from the set of SKUs;
store, at the one or more non-transitory storage modules, the set of one or more clusters of SKUs;
choose, at the one or more processing modules, a set of Bayesian multivariate dynamic linear models (DLMs) to be used to calculate a sales forecast for each SKU of at least a portion of the set of SKUs using the set of one or more clusters of SKUs, wherein the set of one or more clusters of SKUs comprises the at least the portion of the set of SKUs;
determine, at the one or more processing modules, a set of training weights of a conditional predictive distribution for each Bayesian multivariate DLM in the set of Bayesian multivariate DLMs with different values of variance loading parameters that determine relative magnitudes of local levels and seasonal coefficients in the set of Bayesian multivariate DLMs by:
obtaining, from the one or more non-transitory storage modules, first historical sales from a first historical time segment for the set of one or more clusters of SKUs;

forecasting, at the one or more processing modules, first forecasted sales for the first historical time segment for the set of one or more clusters of SKUs:
(1) using, in the set of Bayesian multivariate DLMs, first preceding sales of the set of one or more clusters of SKUs that preceded the first historical sales of the set of one or more clusters of SKUs; and
(2) without using, in the set of Bayesian multivariate DLMs, the first historical sales from the first historical time segment;
store, at the one or more non-transitory storage modules, the first forecasted sales;
obtaining, from the one or more non-transitory storage modules, second historical sales from a second historical time segment for the set of one or more clusters of SKUs;
forecasting, at the one or more processing modules, second forecasted sales for the second historical time segment for the set of one or more clusters of SKUs:
(1) using, in the set of Bayesian multivariate DLMs, second preceding sales of the set of one or more clusters of SKUs that preceded the second historical sales of the set of one or more clusters of SKUs; and
(2) without using, in the set of Bayesian multivariate DLMs, the second historical sales from the second historical time segment;
storing, at the one or more non-transitory storage modules, the first forecasted sales; and
retrospectively regressing, at the one or more processing modules, the first historical sales and the second historical sales with the first forecasted sales and the second forecasted sales from each Bayesian multivariate DLM of the set of Bayesian multivariate DLMs by a time-series cross-validation;
store, at the one or more non-transitory storage modules, the set of training weights;
use the set of training weights to calculate, at the one or more processing modules, the sales forecast for each SKU of the at least the portion of the set of SKUs;
purchase inventory for each SKU of the at least the portion of the set of SKUs based on the sales forecast for each SKU of the at least the portion of the set of SKUs;
receive the inventory for each SKU of the at least the portion of the set of SKUs at a warehouse or a brick and mortar store;
record sales data for the inventory for each SKU of the at least the portion of the set of SKUs; and
repeat a step of determining, at the one or more processing modules, the set of training weights of the conditional predictive distribution for each Bayesian multivariate DLM in the set of Bayesian multivariate DLMs with the different values of the variance loading parameters that determine the relative magnitudes of the local levels and the seasonal coefficients in the set of Bayesian multivariate DLMs using the sales data for the inventory for each SKU of the portion of the set of SKUs as the first historical sales or the second historical sales, wherein:

the set of Bayesian multivariate DLMs are specified as:

$$Y_t = \mu_t + \psi(t)\alpha_t + \epsilon_t \text{ where } \epsilon_t \sim N(0, \sigma^2 I_n)\text{(observational)}$$

$$\begin{bmatrix} \mu_t \\ \alpha_t \end{bmatrix} = \begin{bmatrix} \mu_{t-1} \\ \alpha_{t-1} \end{bmatrix} + \begin{bmatrix} \varepsilon_{1,t} \\ \varepsilon_{2,t} \end{bmatrix} \text{ where}$$

$$\begin{bmatrix} \varepsilon_{1,t} \\ \varepsilon_{2,t} \end{bmatrix} \sim N\left(\begin{bmatrix} 0 \\ 0 \end{bmatrix}, \begin{bmatrix} g_1\sigma^2 R_1 & 0 \\ 0 & g_2\sigma^2 R_2 \end{bmatrix}\right);$$

$Y_t$ comprises a vector of log-sales for a panel of n items at a time t;

$\mu_t$ comprises a nx1 vector of the local levels;

$\alpha_t$ comprises a nx1 vector of the seasonal coefficients relative to a common annual seasonal profile $\psi(t)$ for the panel of n items;

$\varepsilon_{1,t}$ and $\varepsilon_{2,t}$ comprise disturbance vectors comprising multivariate normal random variables with variances $g_1\sigma^2$ and $g_2\sigma^2$;

correlations $R_1$ and $R_2$, $(g_1, g_2)$ comprise variance loadings parameters that determine relative magnitudes of the local levels and the seasonal coefficients; and determining the set of training weights comprises performing the time-series cross-validation of the set of Bayesian multivariate DLMs to fit a linear regression.

16. The non-transitory memory storage module of claim 15, wherein:
determining the set of training weights comprises using a non-linear least squares method to fit the linear regression.

17. The non-transitory memory storage module of claim 15, wherein:
determining the set of training weights comprises using a non-linear least squares method to fit the linear regression;
choosing the set of Bayesian multivariate DLMs to be used to calculate the sales forecast for each SKU of at least the portion of the set of SKUs comprises choosing parameters for each Bayesian multivariate DLM in the set of Bayesian multivariate DLMs, the parameters being related to a seasonality of each SKU of the set of one or more clusters of SKUs; and the computing instructions are further executable by the one or more processing modules to:
periodically determine an accuracy of each Bayesian multivariate DLM in the set of Bayesian multivariate DLMs by comparing sales forecasts for a plurality of overlapping time periods; and
periodically re-create the set of training weights for each Bayesian multivariate DLM in the set of Bayesian multivariate DLMs to recalculate the set of training weights for each Bayesian multivariate DLM in the set of Bayesian multivariate DLMs, wherein each of the plurality of overlapping time periods is 26-weeks long, and each of the plurality of overlapping time periods starts one week after a previous time period.

18. The non-transitory memory storage module of claim 15, wherein:
choosing the set of Bayesian multivariate DLMs to be used to calculate the sales forecast for each SKU of the at least the portion of the set of SKUs comprises choosing parameters for each Bayesian multivariate DLM in the set of Bayesian multivariate DLMs, the parameters being related to a seasonality of each SKU of the set of one or more clusters of SKUs.

19. The non-transitory memory storage module of claim 15, wherein the computing instructions are further executable by the one or more processing modules to:
periodically determine an accuracy of each Bayesian multivariate DLM in the set of Bayesian multivariate DLMs; and
periodically re-create the set of training weights for each Bayesian multivariate DLM in the set of Bayesian multivariate DLMs to recalculate the set of training weights for each Bayesian multivariate DLM in the set of Bayesian multivariate DLMs.

20. The non-transitory memory storage module of claim 19, wherein:
periodically determine the accuracy of each Bayesian multivariate DLM in the set of Bayesian multivariate DLMs comprises comparing sales forecasts for a plurality of overlapping time periods.

* * * * *